United States Patent
Kobayashi et al.

(10) Patent No.: US 6,898,916 B2
(45) Date of Patent: May 31, 2005

(54) WEATHER STRIP

(75) Inventors: Kenji Kobayashi, Aichi (JP); Tsuyoshi Shimizu, Aichi (JP); Taketoshi Ito, Aichi (JP); Kazuyuki Hayashi, Aichi (JP); Kenichi Tsuboi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/315,937

(22) Filed: Dec. 11, 2002

(65) Prior Publication Data

US 2003/0106268 A1 Jun. 12, 2003

(30) Foreign Application Priority Data

Dec. 11, 2001 (JP) ..................... P2001-377569

(51) Int. Cl.⁷ .................................................. B60J 10/02
(52) U.S. Cl. ................ 52/717.04; 52/716.8; 52/717.03; 52/717.05; 52/204.53; 296/146.15
(58) Field of Search ............................. 52/716.5, 716.8, 52/717.03, 717.04, 717.05, 204.53; 296/146.15

(56) References Cited

U.S. PATENT DOCUMENTS

| | | | | |
|---|---|---|---|---|
| 2,763,346 A | * | 9/1956 | Clingman | 52/204.597 |
| 2,814,525 A | * | 11/1957 | Thomas | 296/93 |
| 4,245,450 A | * | 1/1981 | Narita | 52/717.04 |
| 5,261,721 A | * | 11/1993 | Conger et al. | 296/146.15 |
| 5,264,270 A | * | 11/1993 | Agrawal | 428/192 |
| 5,300,346 A | * | 4/1994 | Tamura et al. | 428/156 |
| 5,338,087 A | * | 8/1994 | Gross et al. | 296/146.15 |
| 5,493,815 A | * | 2/1996 | Belser et al. | 49/490.1 |
| 5,613,327 A | * | 3/1997 | Sauve | 49/490.1 |
| 5,744,211 A | | 4/1998 | Nakata et al. | |
| 6,073,406 A | * | 6/2000 | Kearney | 52/287.1 |
| 6,257,643 B1 | * | 7/2001 | Young | 296/93 |
| 6,655,101 B2 | * | 12/2003 | Harel | 52/287.1 |
| 2002/0011506 A1 | * | 1/2002 | Shingu et al. | 224/309 |
| 2003/0106268 A1 | * | 6/2003 | Kobayashi et al. | 49/441 |

* cited by examiner

Primary Examiner—Brian E. Glessner
(74) Attorney, Agent, or Firm—Posz & Bethards, PLC

(57) ABSTRACT

A elastic member of weatherstrip has a base portion with nearly U-shaped section, lips extending from ends of the base portion. An edge of a door glass is adapted to be accommodated in an accommodating portion provided in the elastic member. Each of the inner wall of the accommodating portion, and the inner walls and the outer walls of the lips is covered with a surface treatment layer having a predetermined film thickness. In contrast, the outer wall of the base portion is not covered. An embossing for obtaining a surface like a pearskin-finished one with a surface irregularity is preliminarily performed on the outer wall of the base portion and the outer wall of each of the lips, so that the surface has gloss and color close to those of the surface treatment layer.

17 Claims, 3 Drawing Sheets

WEATHER STRIP

The present application is based on Japanese Patent Application No. 2001-377569, the entire contents of which are incorporated herein by reference.

BACKGROUND OF THE INVENTION

1. Field of the Invention

The present invention relates to a weather strip to be provided in a vehicle.

2. Related Art

A weather strip to be provided in a vehicle is, for example, a mirror bracket. The mirror bracket has a body portion to which a door mirror is attached. This body portion has an elastic member that includes a metal insert. Such an elastic member has a base portion, which has a nearly U-shaped section, and a pair of lips each extending from an end of the base portion. An edge portion of a door glass is adapted to be accommodated in the base portion from the lip side.

To suppress the resistance of the door glass when sliding, and to enhance the durability of the elastic member, a surface treating agent is applied onto an inner wall of the base portion and the lips, with which the door glass may come into contact. Especially, regarding the lips, it is necessary for preventing the leading end of each of the lips from being caught by the door glass to apply the surface treating agent not only onto the inner wall of each of the lips but to the outer wall thereof.

However, when the surface treating agent is applied onto the entire surface of the elastic member, the surface treating agent is applied onto a functionally unnecessary range of the surface thereof. This results in increase in working hours and in the cost of the weather strip.

Meanwhile, it can be considered that the surface treating agent is not applied onto an unnecessary part or the surface of the elastic member to thereby suppress the increase in the cost of the weather strip. However, in this case, there are outstanding differences in gloss and color between the surface-treating-agent-applied portion and an unapplied portion, that is, between the agent-applied surface of the elastic member, such as a rubber member, and the exposed surface thereof. Consequently, there is the danger that the external appearance quality thereof may be degraded.

SUMMARY OF THE INVENTION

The invention is accomplished in view of the aforementioned problems. Accordingly, an object of the invention is to provide a weather strip with a surface treatment layer that is enabled to prevent degradation in the external appearance quality thereof while simultaneously suppressing the increase in the cost thereof.

The present invention for solving the problems is described hereinbelow. Operations and effects of such means are described as needed.

(1) The invention provides a weather strip comprising:
an elastic member having seal lips, in which a covered portion that is covered with a surface treatment layer and an exposed portion that is not covered are formed on at least an externally visible region on a surface of the elastic member,
wherein at least a boundary portion between the covered portion with the surface treatment layer and the exposed portion and a vicinity thereof, or at least the boundary portion, the vicinity thereof, and the exposed portion in the surface of the elastic member is shaped like a face having fine irregularities.

According to the above (1), at least in the externally visible region of the surface of the elastic member, there is the part that is not covered with the surface treatment layer. Thus, a total amount of the surface treating agent to be used for forming the surface treatment layer can be reduced. Thus, the number of working hours can be reduced. Moreover, the cost of the weather strip can be suppressed. Furthermore, in the surface of the elastic member, each of at least the boundary portion between the covered portion with the surface treatment layer and the exposed portion, and the vicinity thereof, or each of at least the boundary portion, the vicinity thereof, and the exposed portion is shaped like a face having fine irregularities. Incidentally, the gloss of the covered portion with the surface treatment layer has a tendency to reduce owing to the presence of this surface treatment layer. However, because each of at least the boundary portion between the covered portion with the surface treatment layer and the exposed portion, and the vicinity thereof, or each of at least the boundary portion, the vicinity thereof, and the exposed portion has fine irregularities, the gloss of each of such portions decreases, as compared with the case that each of such portions has no fine irregularities. Therefore, the difference in gloss between both the parts decreases. Thus, the boundary portion becomes indistinct. Consequently, the degradation in the external appearance quality due to the conspicuous difference in gloss between both the parts can be suppressed.

(2) There is provided a weather strip comprising;
an elastic member having seal lips, in which a covered portion that is covered with a surface treatment layer and an exposed portion that is not covered are formed on at least an externally visible region on a surface of the elastic member,
wherein the surface of the elastic member is shaped like a face having fine irregularities.

According to (2), a total amount of the surface treating agent to be used for forming the surface treatment layer can be reduced. Thus, the number of working hours can be reduced. Moreover, the cost of the weather strip can be suppressed. Furthermore, because fine irregularities are present throughout the surface of the elastic member, the gloss of the surface thereof decreases, as compared with the case that no fine irregularities are present thereon. Therefore, the difference in gloss between both the parts reduces. Thus, the boundary portion becomes indistinct. Consequently, the degradation in the external appearance quality due to the conspicuous difference in gloss between both the parts can be suppressed.

(3) The elastic member maybe formed by molding. Further, embossing is performed on the formed surface to thereby shape the surface of the elastic member like a face having fine irregularities.

According to (3), when performing the molding, the pattern of irregularities formed on the molding surface of a mold, on which the pattern of the irregularities is preliminarily formed, is transferred onto a surface to be formed. Thus, the creping is performed thereon, so that the formed surface is shaped like a face having fine irregularities. Consequently, the surface of the elastic member can be relatively easily shaped like a face having irregularities. Moreover, occurrence of variation in the aforementioned effects can be suppressed among products of the weather strip.

(4) According to the invention, the difference in gloss between the part, which is covered with the surface treatment layer, and the exposed portion, whose surface has irregularities, may be not more than 0.5.

According to (4), the difference in gloss therebetween is not more than 0.5. Thus, the degradation in the external appearance quality due to the conspicuous difference in gloss between both the parts can be more reliably suppressed.

(5) In the invention, the color difference (CIE L*a*b*Color System) between the part, which is covered with the surface treatment layer, and the exposed portion, whose surface has irregularities, may be not more than 1.5.

According to (5), the degradation in the external appearance quality due to the conspicuous color difference between both the parts can be more reliably suppressed.

(6) In the invention, a film thickness of the surface treatment layer at a position in the boundary portion, which is provided between the covered portion with the surface treatment layer and the exposed portion, becomes smaller as the position is closer to the exposed portion.

According to (6), in the boundary portion, the film thickness of the surface treatment layer at a position located in the boundary portion, which is provided between the covered portion with the surface treatment layer and the exposed portion, reduces with decrease in distance from the position to the exposed portion. Thus, the boundary portion becomes more in distinct by attaining what are called gradation effects. Consequently, the degradation in the external appearance quality due to the conspicuous difference in gloss between both the parts can be more reliably suppressed.

(7) In the invention, the density of the irregularities at a position located in the boundary portion, which is provided between the covered portion with the surface treatment layer and the exposed portion, may reduce with decrease in the distance from the position to the exposed portion.

According to (7), the density of the irregularities at a position located in the boundary portion, which is provided between the covered portion with the surface treatment layer and the exposed portion, reduces with decrease in the distance from the position to the exposed portion. Thus, the boundary portion becomes more indistinct by attaining what are called gradation effects. Consequently, the degradation in the external appearance quality due to the conspicuous difference in gloss between both the parts can be more reliably suppressed.

(8) In the invention, the weather strip may be provided as a door mirror bracket. Particularly, a practical example of the door mirror bracket may have an insert and an elastic member with which the insert is covered. This elastic member is adapted to have a base portion, which can accommodate a door glass and has a nearly U-shaped section, and also have a pair of lips each extending from an end of the base portion.

(9) In the invention, there is provided a method of manufacturing a weather strip, comprising the steps of:
  a molding step of molding an elastic member by using a mold that has a molding face treated by forming fine irregularities on at least a part thereof, and
  an applying and forming step of applying a surface treating agent on at least a portion on which a sliding element slides to thereby form a covered portion;
  wherein fine irregularities are exposed on a portion on which surface treatment layer is not formed, and a boundary portion between the covered portion and the portion on which surface treatment layer is not formed and a vicinity thereof in an externally visible region of a surface of the elastic member.

According to (9), the elastic member is molded by using the mold that has a molding face treated by forming fine irregularities on at least a part thereof. A surface of the elastic member, which corresponds to the molding surface undergoing processing for forming fine irregularities thereon, is shaped in such a way as to have fine irregularities formed thereon. Further, the surface treating agent is applied onto the portion including at least the part, on which the sliding element (for instance, a door glass) can slide, of the surface of the elastic member. Thus, the surface treatment layer is formed. At that time, the boundary portion between the portion, on which the surface treatment layer is formed, and the portion, on which no surface treatment layer is formed, and the vicinity thereof or the boundary portion, the vicinity thereof, and the portion, on which no surface treatment layer is formed, of the visible part of the surface of the elastic member are exposed in such a way as to have fine irregularities formed thereon. Incidentally, the gloss of the portion covered with the surface treatment layer has a tendency to reduce owing to the presence of this surface treatment layer. However, because each of at least the boundary portion between the portion, on which the surface treatment layer is formed, and the portion, on which no surface treatment layer is formed, and the vicinity thereof, or each of at least the boundary portion, the vicinity thereof, and the portion, on which no surface treatment layer is formed, are exposed in such a manner as to have fine irregularities, the gloss of each of such portions decreases, as compared with the case that each of such portions has no fine irregularities. Therefore, the difference in gloss between both the parts decreases. Thus, the boundary portion becomes indistinct. Consequently, the degradation in the external appearance quality due to the conspicuous difference in gloss between both the parts can be suppressed.

DETAILED DESCRIPTION OF THE PREFERRED EMBODIMENTS

Figure 1:
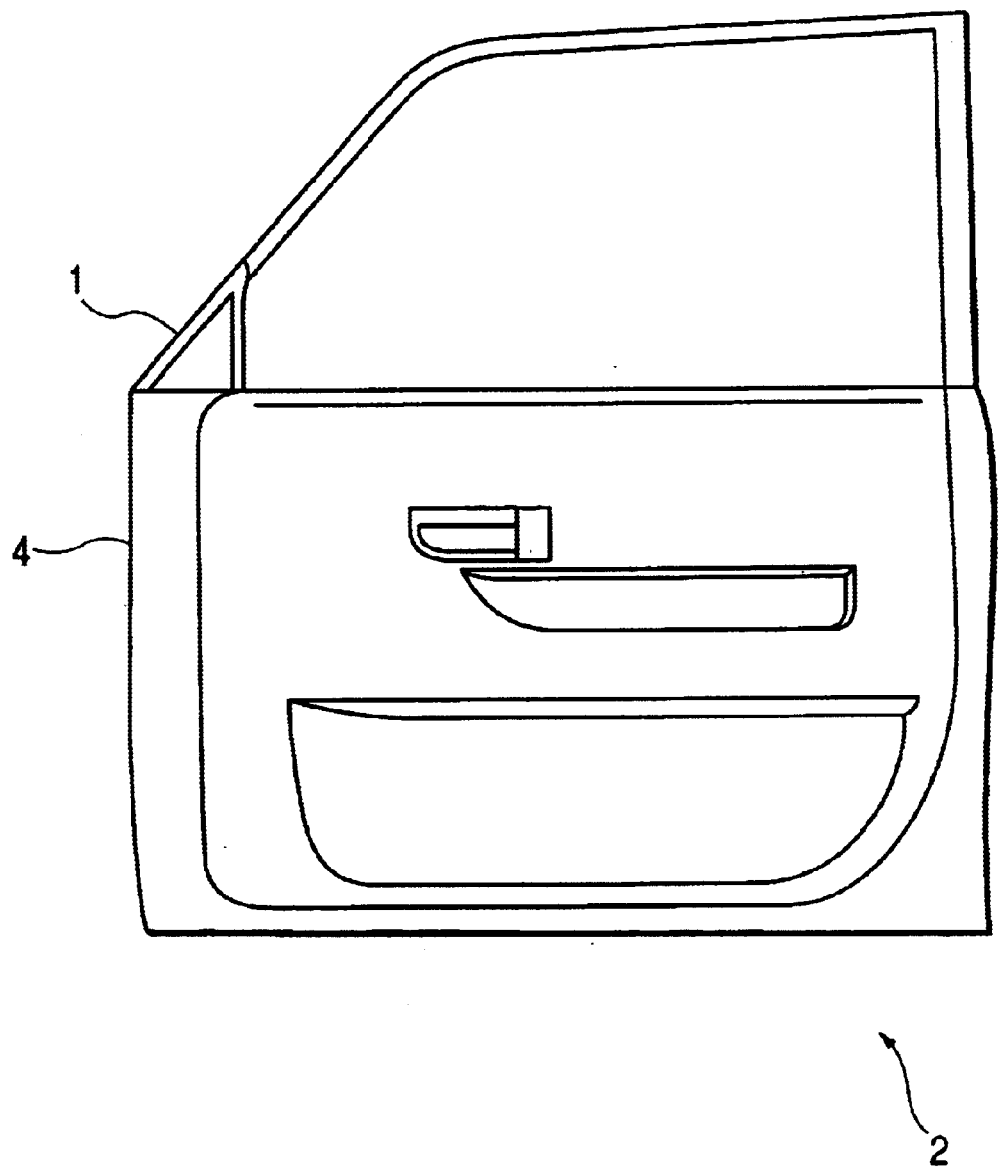
FIG. 1 is a front view showing a state of a door, which is seen from the inside of a vehicle, to illustrate a position at which a door mirror bracket is provided in an embodiment of the invention.
Figure 2A:
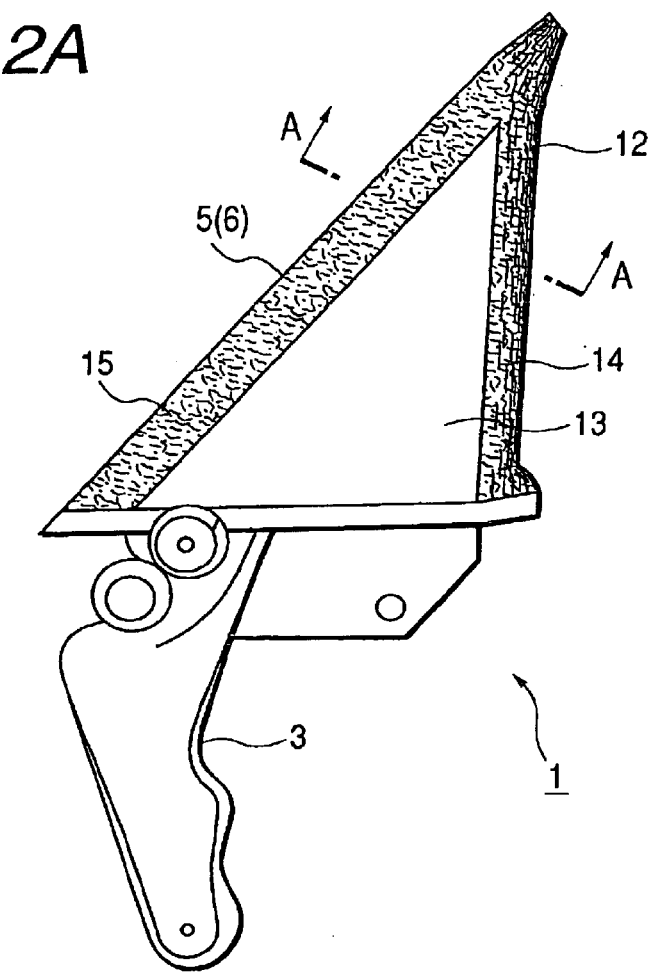
FIG. 2A is a front view of the door mirror bracket.
Figure 2B:
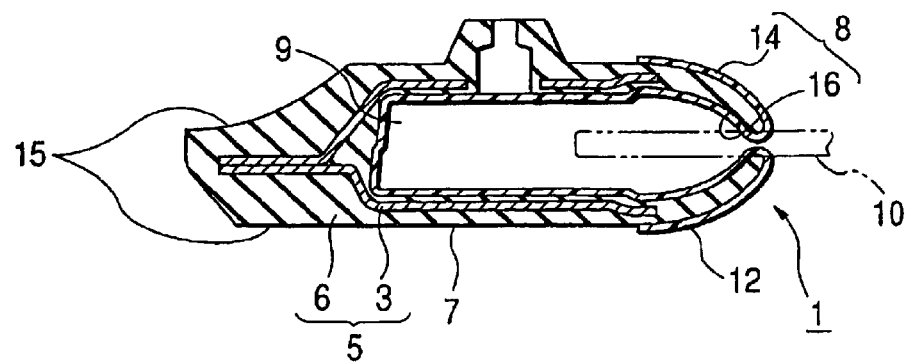
FIG. 2B is a sectional view taken along line A—A of FIG. 2A.

Hereinafter, an embodiment of the invention is described by referring to the accompanying drawings. As shown in FIG. 1, a mirror bracket 1 serving as a weather strip is attached to a front door 2 of an automobile. A door mirror (not shown) is attached to the mirror bracket 1. As shown in FIGS. 2A and 2B, the mirror bracket 1 has a metallic bracket base member 3. A lower portion of this bracket base member 3 is an attaching portion to be fixed to a door panel 4. Further, an upper portion thereof functions as an insert of a body portion 5 of a nearly triangular shape. That is, the upper portion of the bracket base member 3 is covered with the elastic member 6. The body portion 5 consists of such an upper portion of the bracket base member 3 and the elastic member 6.

The elastic member 6 is a forming element made of EPDM (an ethylene-propylene-diene terpolymer). The elastic member 6 has a base portion 7, which has a nearly U-shaped section, and a pair of lips 8 each extending from an end of the base portion 7. The inside of the elastic member 6 serves as an accommodating portion 9. An edge portion of a door glass 10 is adapted to be accommodated in the accommodating portion 9. Further, each of the vehicle-interior-side surface and the vehicle-exterior-side surface of the door glass 10 is adapted to be sealed with a corresponding one of the lips 8. Each of the inner wall of the accommodating portion 9, and the inner walls 16 and the outer walls 14 of the lips 8 is covered with a surface treatment layer 12 for enabling the door glass 10 to smoothly slide. Generally, as compared with a mirror finished surface that is formed by molding and made of EPDM, the surface covered with the surface treatment layer 12 is low in gloss and slightly differs in color therefrom. Incidentally, a polyurethane covering material of what is called the primer internally-adding type is employed as the surface treating agent constituting the surface treatment layer 12 of this embodiment.

Further, the body portion 5 is partly covered by attaching nearly-triangular covers 13 thereto from the vehicle exterior side and the vehicle interior side. Thus, during a state in which the mirror bracket 1 is assembled to an automobile, externally visible parts (hereunder referred to as "visible portions") are a part of each of the outer walls 14 of the lips 8, and a back portion 15 that is a part of the outer wall of the base portion 7 disposed opposite to the lips 8.

Figure 3:
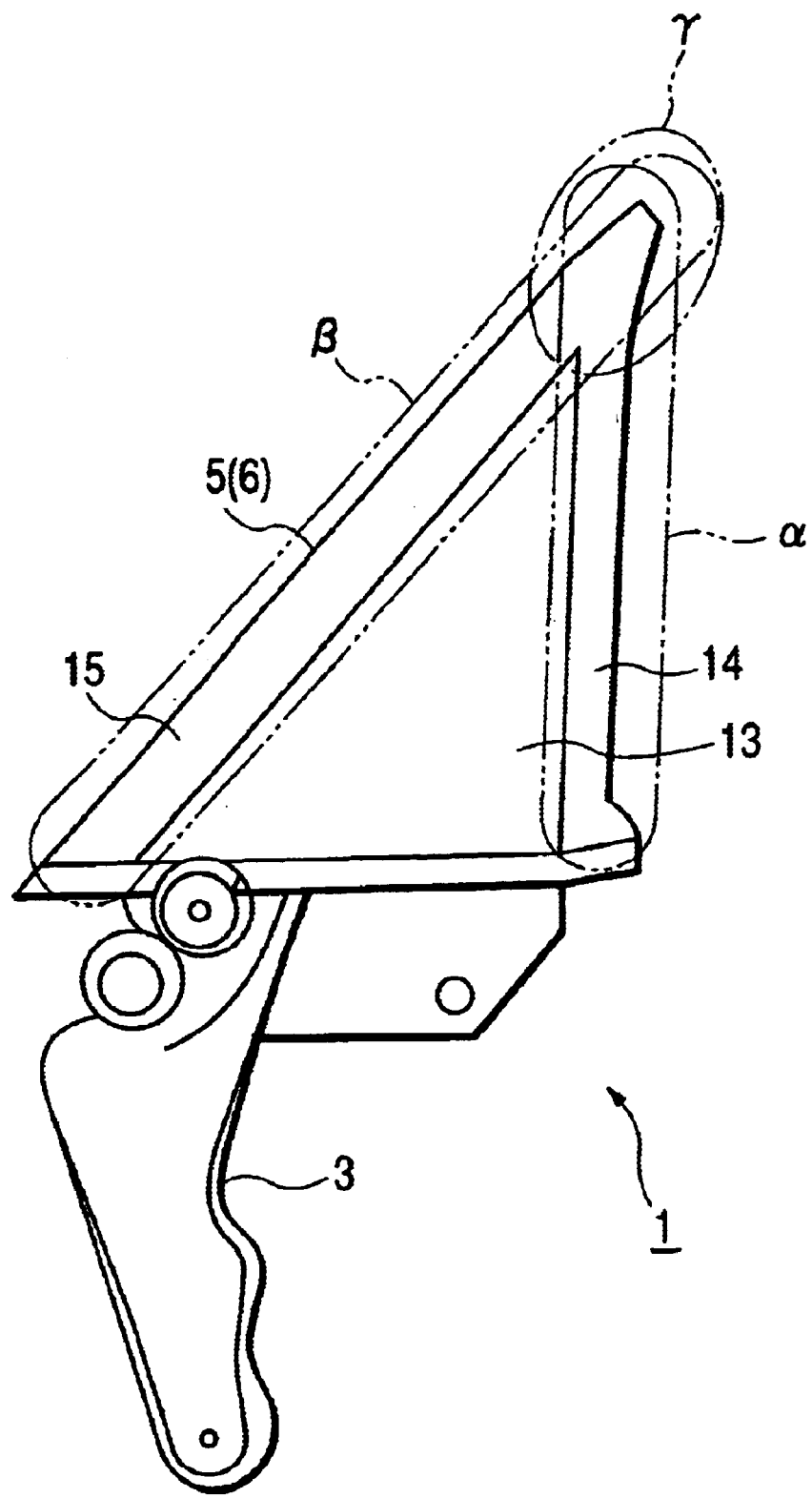
FIG. 3 is a front view showing the door mirror bracket to illustrate a portion thereof, which is covered with a surface treatment layer, and an exposed portion thereof.

Hereunder, the covering range of the surface treatment layer 12 is further described in detail by referring to FIG. 3. In this embodiment, the inner wall of the accommodating portion 9, the inner walls 16 of the lips 8, and the outer wall 14 are covered with the surface treatment layer 12 of a predetermined thickness. In contrast, the outer wall of the base portion 7 is not covered therewith. In a portion, at which the outer wall 14 of the lip 8 provided on the upper part of the elastic member 6 intersects with the back portion 15 and in proximity thereto, the film thickness of the covering of the surface treatment layer 12 gradually decreases toward the back portion 15 along the longitudinal direction of the mirror bracket. That is, in a boundary portion γ between a part α, which is covered with the surface treatment layer 12, and a part β, which is not covered therewith, the film thickness of the surface treatment layer 12 reduces toward the exposed portion β.

Further, in this embodiment, an embossing for obtaining a surface like a pearskin-finished one, which operation is a surface irregularity treatment for obtaining gloss and color that are close to those of the surface treatment layer 12, is preliminarily performed on the outer wall of the elastic member 6 (that is, the outer wall of the base portion 7 and the outer wall 14 of each of the lips 8). When such an embossing is performed, molds, whose forming surfaces are blasted, are used. More particularly, blasting (Shot Blast AB#80) is performed on a plurality of forming surfaces of molds for forming the outer wall of the elastic member 6 among molds for forming the elastic member 6. Exemplary surface irregularities resulting from the above embossing on the outer wall of the elastic member 6, as well as the associated texture of the surface treatment layer 12, are shown in FIG. 2A but not in FIG. 2B.

Next, a method of manufacturing the mirror bracket 1 configured as described above is described hereinbelow. First, the bracket base member 3 is set at a predetermined position in the mold. Then, EPDM is filled into a cavity. After hardening, a molded element (that is, the elastic member 6) is taken out of the mold. The outer wall of the elastic member 6 obtained at that time has undergone the embossing for obtaining a surface like a pearskin-finished one.

Subsequently, a nozzle of a spray gun (not shown) is inserted into the accommodating portion 9 from the side of the lips 8. Then, the surface treating agent is blown off from the spray gun and almost uniformly applied onto the inner wall of the accommodating portion 9 and the inner walls 16 of the lips 8. Subsequently, the nozzle of the spray gun is taken out of the accommodating portion 9. Now, the surface treating agent is applied to the outer walls 14 of the lips 8. At that time, gradation covering is performed on the portion γ, at which the outer wall 14 of the lip 8 provided in the upper portion of the elastic member 6 intersects with the back portion 15, by increasing the distance between the spray gun and a place, on which the surface treating agent is applied, so that the closer to the back portion 15 the place is located, the less an amount of the surface treating agent applied thereonto becomes. Thus, the aforementioned mirror bracket 1 is obtained.

Hereinafter, the gloss and color of the mirror bracket 1 manufactured in the aforementioned manner are described. First, similarly as the elastic member of this embodiment, an elastic member was formed as a comparative example without performing creping thereon. Further, a surface treatment layer similar to that of this embodiment was formed on a part of the surface of the comparative example. Then the gloss difference between a part, which was covered with such a surface treatment layer, and a part, which was not covered with the surface treatment layer, was measured. Consequently, the gloss difference was 5.9 and extremely conspicuous. In contrast, in the case of the elastic member 6 of this embodiment, the gloss difference between the part, which was covered with the surface treatment layer 12, and the part, which was not covered with the surface treatment layer, was 0.4 and very small. There was little difference therebetween.

Then, the color difference Δ (CIE L*a*b*Color System) between the part, which was covered with the surface treatment layer, and the part, which was not covered with the surface treatment layer, of the comparative example was measured. Consequently, the color difference ΔE was 3.0 and outstandingly large. In contrast, in the case of the elastic member 6 of this embodiment, the color difference ΔE between the part, which was covered with the surface treatment layer 12, and the part, which was not covered with the surface treatment layer, was 1.2 and very small. Thus, there was almost no color difference therebetween.

As described above in detail, according to this embodiment, creping is performed on the outer wall of the body portion 5 (that is, the elastic member 6). Thus, the gloss difference and color difference between the portion α, which is covered with the surface treatment layer 12, and the portion β, which is not covered with the surface treatment layer 12, of the outer wall of the body portion 5 (that is, the elastic-body 6) are very small, as compared with those in the case that creping is not performed thereon. Consequently, this embodiment can almost completely eliminate the differences in gloss and color therebetween. Hence, the difference in external appearance between the portion α, which is covered with the surface treatment layer 12, and the portion β, which is not covered with the surface treatment layer 12, can be extremely reduced. Consequently, even when the surface treatment layer 12 is not provided on the entire surface of the mirror bracket 1, the external appearance quality can be extremely enhanced.

Moreover, the gradation covering is performed on the boundary portion γ, at which the outer wall 14 of the lip 8 provided in the elastic member 6 intersects with the back portion 15, that is, between the portion α, which is covered with the surface treatment layer 12, and the portion β, which is not covered therewith. Thus, the gloss and color of the portion α, which is covered with the surface treatment layer 12, can be gradually made to approximate to those of the portion β, which is not covered with the surface treatment layer 12. Consequently, the difference in external appearance therebetween due to the presence/absence of the surface treatment layer 12 can be obscured still more.

Additionally, as described above, in this embodiment, there is no need for applying the surface treating agent on the entire visible portion. Moreover, because the surface treating agent is partly applied onto the mirror bracket, it is unnecessary for limiting the range of applying the agent to apply masking tape to a part that is not covered with the layer. Consequently, increase in manufacturing cost thereof and reduction in working efficiency can be suppressed.

Incidentally, the invention is not limited to the described embodiment. For example, the invention may be practiced as follows.

(a) Although the creping for obtaining a pearskin-finished surface is performed in the embodiment as an operation of shaping the surface in such a way as to have fine irregularities, the kind of an embossing is not limited thereto. Further, although the blasting is performed on the mold so as to perform the creping, other operations may be employed so as to form fine irregularities on the surface. Alternatively, after the molding, an operation of forming imprints of irregularities is performed by using a press-mold without performing an operation, such as blasting, on the mold. Further, alternatively, the operation of shaping the surface in such a way as to have fine irregularities is not limited to the creping. The surface of a forming face may be worn away so as to form fine irregularities. Furthermore, alternatively, chemical surface treatment may be performed on the surface.

(b) Although the outer walls 14 of the lips 8 are covered with the surface treatment layer 12 of a predetermined film thickness in the aforementioned embodiment, the mirror bracket may be adapted so that only a range of each of the outer walls 14, which is caught by the door glass 10 when sliding, that is, only the neighborhood of a leading end of each of the lips 8 is covered with the layer 12 of the predetermined film thickness, and that the thickness of a portion of the surface treatment layer 12, which portion is other than a part provided in the neighborhood of the end of each of the lips 8, gradually reduces with distance from the end of each of the lips 8.

(c) Although the covering film thickness of the surface treatment layer 12 is gradually changed in the boundary γ between the portion α, which is covered with the surface treatment layer 12, and the portion β, which is not covered therewith, along the longitudinal direction in this embodiment of the mirror bracket, this embodiment may be modified so that such a gradual change in the film thickness of the surface treatment layer 12 is not imparted to the mirror bracket.

(d) The boundary between the portion α, which is covered with the surface treatment layer 12, and the portion β, which is not covered therewith, may be obscured still more by gradually changing the degree of surface irregularity treatment along the longitudinal direction of the mirror bracket.

(e) Although the mirror bracket 1 has been described in the foregoing description of the embodiment as the weather strip of the invention, techniques according to the invention may be applied to other weather strips, such as a glass run, an outer weather strip, and an inner weather strip.

(f) The material of the elastic member 6 is not necessarily limited to EPDM. Other materials, for instance, rubber and a resin, such as TPO, may be used, (g) It is not always necessary for applying the surface treating agent to employ a spray gun other applying means, such as a brush, may be employed.

(h) A simple polyurethane covering, or a simple silicone covering may be employed as the surface treating agent, in addition to the polyurethane covering material of what is called the primer internally-adding type exemplified in the foregoing description of the embodiment.

What is claimed is:

1. A weather strip for accommodating a movable window panel, comprising:
    an elastic member having seal lips, in which a covered portion that is integrally covered with a surface treatment layer and an exposed portion that is not covered are formed on at least an externally visible region on a surface of the elastic member, wherein
    at least a boundary portion between said covered portion with said surface treatment layer and said exposed portion and a vicinity thereof, or at least said boundary portion, said vicinity thereof, and said exposed portion in the surface of said elastic member have fine irregularities.

2. A weather strip according to claim 1, wherein a difference in gloss between said covered portion covered with said surface treatment layer and the exposed portion whose surface has irregularities is not more than 0.5.

3. A weather strip according to claim 1, wherein a color difference between said part, which is covered with said surface treatment layer, and said exposed portion, whose surface has irregularities, is not more than 1.5 based on a CIE L*a*b Color System standard.

4. A weather strip comprising:
    an elastic member having seal lips, in which a covered portion that is covered with a surface treatment layer and an exposed portion that is not covered are formed on at least an externally visible region on a surface of the elastic member, wherein
    at least a boundary portion between said covered portion with said surface treatment layer and said exposed portion and a vicinity thereof, or at least said boundary portion, said vicinity thereof, and said exposed portion in the surface of said elastic member have fine irregularities, and
    a thickness of said surface treatment layer at a position in said boundary portion, which is provided between said covered portion with said surface treatment layer and said exposed portion, becomes smaller closer to said exposed portion.

5. A weather strip according to claim 1, wherein a density of the irregularities at a position in the boundary portion becomes smaller closer to the exposed portion.

6. A weather strip according to claim 1, wherein the weather strip comprises a vehicle door mirror bracket.

7. A weather strip for accommodating a movable window panel, comprising:
    an elastic member having seal lips, in which a covered portion that is integrally covered with a surface treatment layer and an exposed portion that is not covered are formed on at least an externally visible region on a surface of the elastic member,
    wherein the surface of said elastic member has fine irregularities, and
    said elastic member is formed by molding, and a molded surface is processed by an embossing so as to shape the surface of said elastic member with fine irregularities.

8. A weather strip according to claim 7, wherein a difference in gloss between said covered portion covered with said surface treatment layer and the exposed portion whose surface has irregularities is not more than 0.5.

9. A weather strip according to claim 7, wherein a color difference between said part, which is covered with said surface treatment layer, and said exposed portion, whose surface has irregularities, is not more than 1.5 based on a CIE L*a*b Color System standard.

10. A weather strip according to claim 7, wherein a film thickness of said surface treatment layer at a position in said boundary portion, which is provided between said covered portion with said surface treatment layer and said exposed portion, becomes smaller closer to said exposed portion.

11. A weather strip according to claim 7, a density of the irregularities at a position in the boundary portion becomes smaller as the position is closer to the exposed portion.

12. A weather strip according to claim 7, wherein the weather strip as a comprises a vehicle door mirror bracket.

13. A weather strip for accommodating a movable vehicle window panel, comprising:

an elastic member having seal lips and an accommodating portion having an opening defined by the seal lips for accommodating the movable vehicle window panel, the elastic member having a first portion that is integrally covered with a surface treatment layer, a second portion that is not covered with the surface treatment layer, and a third portion between the first and second portions that is integrally covered with the surface treatment layer such that a thickness of the surface treatment layer covering the third portion decreases in proportion to proximity of the surface treatment layer to the second portion.

14. A weather strip according to claim 13, wherein a surface of the elastic member has fine irregularities.

15. A weather strip according claim 13, wherein the elastic member is shaped substantially in the form of a triangle, and the third portion thereof represents an area in a vicinity of a point of the triangle at which the first and second portions intersect.

16. A weather strip according to claim 13, wherein a difference in gloss between the first and second portions is not more than 0.5.

17. A weather strip according to claim 13, wherein a color difference between the first and second portions is not more than 1.5 based on a CIE L*a*b Color System standard.

* * * * *